United States Patent
Mairhofer

(10) Patent No.: US 6,658,926 B2
(45) Date of Patent: Dec. 9, 2003

(54) METHOD FOR MONITORING SLIDE BEARINGS, ESPECIALLY OF A PISTON ENGINE

(75) Inventor: Gerhard Mairhofer, Grünau (AT)

(73) Assignee: Miba Gleitlager Aktiengesellschaft, Laakirchen (AT)

( * ) Notice: Subject to any disclaimer, the term of this patent is extended or adjusted under 35 U.S.C. 154(b) by 0 days.

(21) Appl. No.: 10/245,600

(22) Filed: Sep. 17, 2002

(65) Prior Publication Data

US 2003/0051543 A1 Mar. 20, 2003

(30) Foreign Application Priority Data

Sep. 19, 2001 (AT) .......................................... 1485/2001

(51) Int. Cl.⁷ .............................................. G01M 15/00
(52) U.S. Cl. .................................................... 73/119 R
(58) Field of Search .............................. 73/119 R, 116, 73/9, 118.1, 49.7; 123/321–325, 184.31, 27 R, 80 BA, 90.16; 184/6.4

(56) References Cited

U.S. PATENT DOCUMENTS 4,940,400 A  *  7/1990  Speiser et al. ............. 418/61.2
5,275,258 A  *  1/1994  Bousseau .................... 184/6.4
5,852,970 A  * 12/1998  Bornhorst et al. ............ 100/53

FOREIGN PATENT DOCUMENTS

| DE | 249 075 A1 | 8/1987 |
| DE | 196 14 803 | 10/1997 |
| EP | 0 029 736 | 11/1980 |
| EP | 0 161 644 | 5/1985 |
| JP | 57 082 742 | 5/1982 |
| JP | 61 105 306 | 5/1986 |
| JP | 11 072 398 | 3/1999 |

* cited by examiner

Primary Examiner—Kamand Cuneo
Assistant Examiner—Monica D. Harrison
(74) Attorney, Agent, or Firm—Collard & Roe, P.C.

(57) ABSTRACT

A method is described for monitoring slide bearings (10, 6, 9), especially of a piston engine, with a forced feed lubrication (12) comprising a forced-oil line (16) and branch lines (17) branching off from the forced-oil line (16) for the supply with oil of at least one slide bearing (10, 6, 9), with an operating parameter which changes on the occurrence of bearing damage being repeatedly measured and evaluated. In order to provide advantageous process conditions it is proposed that the rates of oil flow and/or the oil pressures in the branch lines (17) are measured and temporal changes to said operating parameters are evaluated for monitoring the bearing.

6 Claims, 1 Drawing Sheet

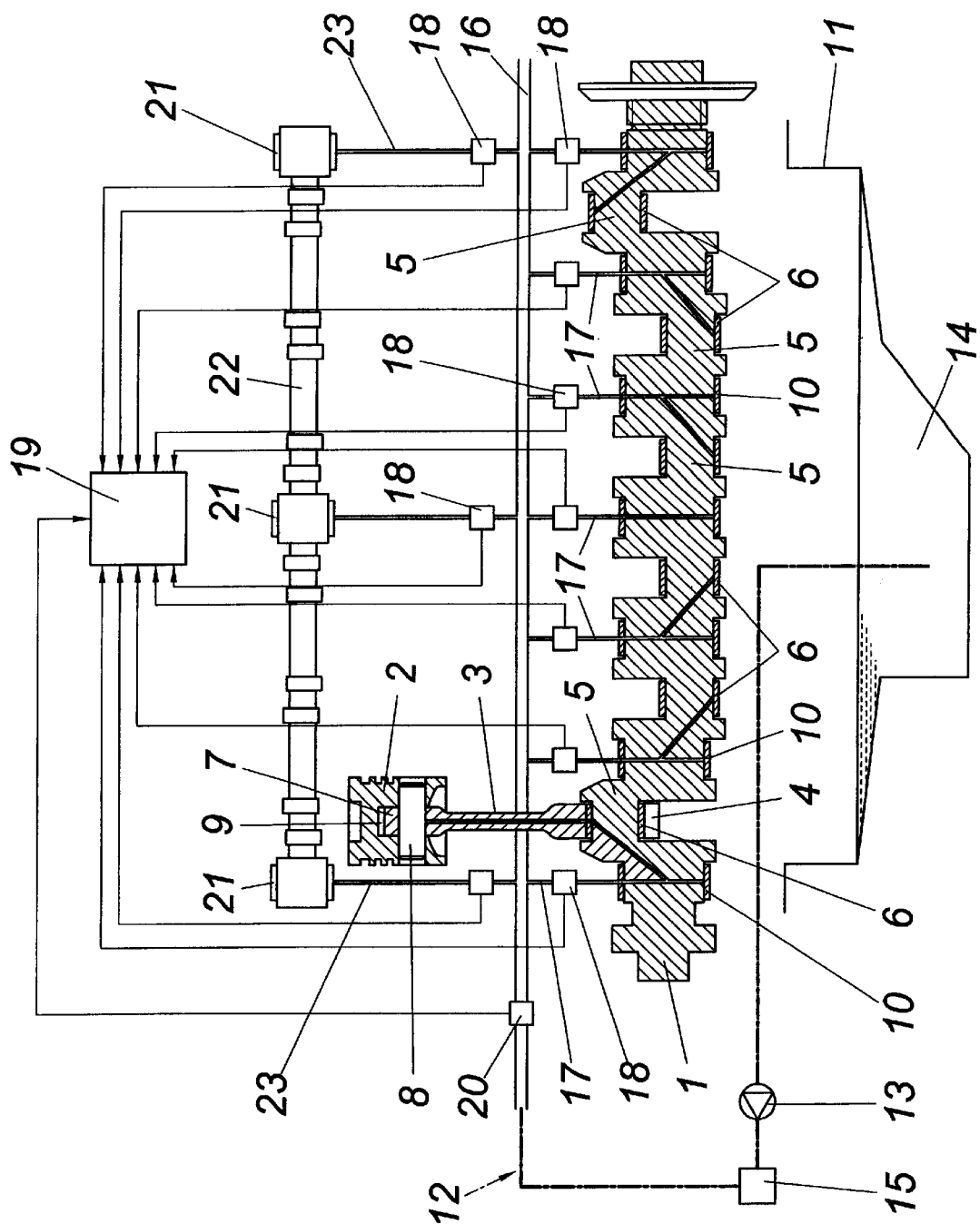

METHOD FOR MONITORING SLIDE BEARINGS, ESPECIALLY OF A PISTON ENGINE

FIELD OF THE INVENTION

The invention relates to a method for monitoring slide bearings, especially of a piston engine, with a forced feed lubrication comprising a forced-oil line and branch lines branching off from the forced-oil line for the supply with oil of at least one slide bearing, with an operating parameter which changes on the occurrence of bearing damage being repeatedly measured and evaluated.

DESCRIPTION OF THE PRIOR ART

For the purpose of monitoring the slide bearings of piston engines it has already been proposed (EP 0161644 A2, DD 249075 A1, DE 19614803 A, JP 61105306 A) to monitor the temperature in the zone of the bearing box during the bearing operation in order to recognize any bearing damage announced by an increase in the temperature at an early time and to enable precautions to be taken for respective countermeasures. For this purpose temperature sensors are inserted into bores of the bearing supporting body, which bores extend in part up to the bearing box. The disadvantage in these known apparatuses for monitoring the temperature in the running layer zone is on the one hand that the bearing shells need to be tapped in order to avoid having to cope with longer response times for temperature detection which are caused by heat conduction and on the other hand that despite tapping the bearing shell at several places the response behavior is too sluggish when the damage which announces itself by an increase in the temperature is situated outside of the direct measurement zones which are determined by the position of the bores for the temperature sensors. Similar disadvantages occur when the lubricant pressure in the bearing clearance is detected by way of a bore which penetrates the bearing shell (JP 11072398 A) or when additional temperature sensors are provided in the zone of the measuring location for the lubricant pressure (EP 0029736 A1, JP 5782742A).

Since cracks occur in the bearing surface area towards the end of the service life of the bearing due to beginning material fatigue of the bearing surface material which lead to a local deformation of the bearing surface and subsequently to an increased metallic contact between bearing and shaft, it has also been proposed to use the thus caused change of the electric contact resistance between shaft and bearing for monitoring a slide bearing. The complexity of the measuring equipment required for this purpose is prohibitive, however.

SUMMARY OF THE INVENTION

The invention is thus based on the object of monitoring slide bearings, especially of piston engines, with a comparably low amount of effort without having to implement any measures on the slide bearings per se for detecting an operating parameter which changes upon the occurrence of a damage to the bearing.

Based on a method for monitoring slide bearings of the kind mentioned above, the invention achieves the object in such a way that the rates of oil flow and/or the oil pressures in the branch lines are measured and temporal changes to said operating parameters are evaluated for monitoring the bearing.

The invention is based on the finding that the local deformation in the bearing surface which is caused by the commencing fatigue of the bearing layer material and leads to an increase in wear and tear entails a progressively increasing bearing clearance in cooperation with a simultaneously occurring temperature increase at a respective dynamic bearing load. Said increase in the bearing clearance has an influence at a predetermined lubricant pressure on the rate of oil flow or at a given rate of oil flow on the oil pressure, so that by detecting the rate of oil flow and/or the oil pressure in a branch line the slide bearing supplied with lubricating oil through said branch line or the group of slide bearings connected to said branch line can be monitored concerning a commencing fatigue of the bearing layer material in a simple and effective manner. Since the oil demand of a bearing increases progressively in relationship to the bearing play, the beginning fatigue of the bearing surface material of a connected slide bearing can be recognized at an early stage through the measurement of the rate of oil flow and/or the oil pressures in the branch lines. The occurring changes concerning the rates of oil flow or the oil pressures need to be put in relation to the respective supply conditions of the lubricating oil in order to avoid erroneous evaluations concerning fluctuations in the supply pressure or supply quantities.

To ensure that changes in the rates of oil flow or the oil pressures in the branch lines can be brought into relationship in a simple manner with imminent damage to the slide bearings which are supplied with lubricating oil through said branch lines, changes in the rates of oil flow and/or the oil pressures in the individual branch lines can be compared with each other. Since one can assume that damage to bearings will occur individually and not simultaneously, it is thus possible, by a comparison of the changes of the rates of oil flow and/or the oil pressure arising in the zone of a branch line, to simply consider changes concerning the lubricating oil supply concerning the entire lubricating system with the respective measured values for the other branch lines, so that only increases in the rate of oil flow and/or the pressure loss in a branch line which deviate from said total changes are used for monitoring the bearing.

BRIEF DESCRIPTION OF THE DRAWING

The drawing is used to explain the method in accordance with the invention for monitoring slide bearings, with a forced feed lubrication for an internal combustion engine being shown in a schematic block diagram.

DESCRIPTION OF THE PREFERRED EMBODIMENT

The illustrated embodiment shows the crankshaft 1 of an internal combustion engine, with only one piston 2 being indicated of the six cylinders thereof. Said piston 2 is connected like the other pistons via a connecting rod 3 with the crankshaft 1. The connecting rod head 4 is held in a conventional manner on a crank pin 5, with the help of a slide bearing 6. The slide bearing hor holding the connecting rod eye 7 on the piston pin 8 is designated with reference numeral 9. The crankshaft 1 itself is held by slide bearings 10 in a crankcase (not shown in closer detail) whose oil pan bears the reference numeral 11. The slide bearings 10, 6 and 9 of the crank mechanism are supplied by a forced feed lubrication 12 with lubricating oil. Said forced feed lubrication 12 comprises an oil pump 13 which sucks in lubricating oil from the sump pan 14 of the oil pan 11 and conveys it through filter 15 to a compressed oil line 16 from which branch lines 17 branch off for supplying oil to the slide bearings 10, 6 and 9 which are lined up in consecutive groups with respect to the lubricating oil flow. The lubricating oil supplied via the branch lines 17 to the slide bearings 10, 6 and 9 is collected in the oil pan 11 of the crankcase and re-circulated to the slide bearings.

In order to enable the simple monitoring of the slide bearings 10, 6 and 9 of the crank mechanism, measuring devices 18 are provided in the branch lines 17 with the help of which the rate of oil flow is determined in a conventional manner either by a direct measurement or by a measurement of differential pressure. The results of the measurement are forwarded to an evaluation circuit 19 which is also supplied with the lubricating oil pressure in the oil pressure line 16 which is determined by means of a pressure sensor 20 so as to be able to take into account pressure fluctuations in the oil pressure line 16 concerning the measurement of rate of flow in the individual branch lines 17.

Since in a conventional lubricating oil supply with a predetermined oil pressure the oil quantity conveyed through the branch lines 17 is co-determined to a considerable extent by the bearing clearances of the slide bearings 10, 6 and 9, changes concerning said bearing clearances can be detected via the measuring devices 18. The fact that the commencing fatigue of the bearing material is accompanied by an increase of the bearing clearance can be utilized for monitoring the slide bearings 10, 6 and 9 by means of the detection of the rate of oil flow in the branch lines 17, which slide bearings are each supplied with lubricating oil by the branch lines 17. Through a comparison of the rates of flow in the individual branch lines 17 as detected with the help of the measuring devices 18, the increases of the flow rate can be determined by taking into account any pressure fluctuations in the oil pressure line 16 which allow concluding that there is a commencing damage to the bearing.

According to the illustrated embodiment, the slide bearings 21 for the camshaft 22 of the internal combustion engine are connected to the forced feed lubrication 12. It is unnecessary to mention that also the slide bearings 21 can be monitored accordingly by respective monitoring devices 18 in the branch lines 23 concerning their supply with lubricating oil.

If in the forced-oil lubrication 12 it is not the lubricating oil pressure but the lubricating oil quantity which is predetermined, a commencing damage to the bearing from an increasing bearing play will begin to show itself by a respective pressure drop. In such a case it is necessary to measure the lubricating oil pressure in the branch lines 17 and 23.

What is claimed is:

1. A method of monitoring, slide bearings of a piston engine, which has a forced feed lubrication for the slide bearings, the forced feed lubrication comprising a forced oil line and at least one branch line leading from the forced oil line to at least one of the slide bearings for supplying oil thereto, which comprises the steps of repeatedly measuring the rate of oil flow in the branch line as an operating parameter which changes on the occurrence of bearing damage, and evaluating temporal changes in said operating parameter.

2. The method of claim 1, wherein the forced feed lubrication comprises a plurality of said branch lines leading to a corresponding plurality of the slide bearings, which comprises the step of comparing the operating parameters in the branch lines with each other.

3. A method of monitoring slide bearings of a piston engine, which has a forced feed lubrication for the slide bearings, the forced feed lubrication comprising a forced oil line and at least one branch line leading from the forced oil line to at least one of the slide bearings for supplying oil thereto, which comprises the steps of repeatedly measuring the oil pressure in the branch line as an operating parameter which changes on the occurrence of bearing damage, and evaluating temporal changes in said operating parameter.

4. The method of claim 3, wherein the forced feed lubrication comprises a plurality of said branch lines leading to a corresponding plurality of the slide bearings, which comprises the step of comparing the operating parameters in the branch lines with each other.

5. A method of monitoring slide bearings of a piston engine, which has a forced feed lubrication for the slide bearings, the forced feed lubrication comprising a forced oil line and at least one branch line leading from the forced oil line to at least one of the slide bearings for supplying oil thereto, which comprises the steps of repeatedly measuring the rate of oil flow and the oil pressure in the branch line as an operating parameter which changes on the occurrence of bearing damage, and evaluating temporal changes in said operating parameter.

6. The method of claim 5, wherein the forced feed lubrication comprises a plurality of said branch lines leading to a corresponding plurality of the slide bearings, which comprises the step of comparing the operating parameters in the branch lines with each other.

* * * * *